United States Patent

[11] 3,626,406

[72] Inventor Tadamitsu Iritani
Tokyo, Japan
[21] Appl. No. 67,031
[22] Filed Aug. 26, 1970
[45] Patented Dec. 7, 1971
[73] Assignee Yokogawa Electric Works, Ltd.
Tokyo, Japan
[32] Priorities Sept. 26, 1969
[33] Japan
[31] 44/76783;
Dec. 11, 1969, Japan, No. 44/99581

[54] CODE SIGNAL INPUT APPARATUS
3 Claims, 4 Drawing Figs.

[52] U.S. Cl. .......... 340/347 DD, 307/242, 178/68, 340/345 R
[51] Int. Cl. .......... H03k 17/56
[50] Field of Search .......... 307/242, 246, 259; 178/66, 68; 340/347 DD, 350, 354, 345, 167, 365, 174 LA, 173 R

[56] References Cited
UNITED STATES PATENTS

| | | | |
|---|---|---|---|
| 3,307,174 | 2/1967 | Klinikowski .......... | 340/345 |
| 3,541,239 | 11/1970 | Reid .......... | 307/242 |

*Primary Examiner*—Thomas A. Robinson
*Attorney*—Chittick, Pfund, Birch, Samuels & Gauthier

ABSTRACT: In apparatus to write a code signal generated by code signal-generating means such as a switch located at a measuring point into a computer, an insulation transformer is connected between the code signal-generating means and an output circuit. A series diode and a parallel capacitor are connected to a circuit interconnecting the primary winding of the insulation transformer and the code signal-generating means. A pulse is normally applied to the secondary winding of the insulation transformer to charge the capacitor through the diode. The capacitor is discharged when the switch is closed to decrease the secondary impedance of the transformer to produce an output signal corresponding to the code signal.

INVENTOR.
TADAMITSU IRITANI
BY Chittick, Pfund, Birch, Samuels & Gauthier

INVENTOR
TADAMITSU IRITANI
BY Chittick, Pfund, Birch, Samuels & Gauthier

CODE SIGNAL INPUT APPARATUS

BACKGROUND OF THE INVENTION

This invention relates to a code signal input apparatus to write code signals generated by the opening and closing operation of a contact into a data processing apparatus such as an electronic computer.

In the electronic computer control system, in order to write code signals generated by the operation of a contact installed at a measuring point into the computer it is necessary to provide DC insulation between the computer and the contact at the measuring point. For this purpose, it has been the practice to write code signals into the computer through a transistor switch which is controlled to become ON and OFF by DC voltages corresponding to the code signals generated by the apparatus installed at the measuring point. However, this circuit arrangement is complicated and its reliability is low.

SUMMARY OF THE INVENTION

It is an object of this invention to provide a novel code signal input apparatus for a computer which is simple in construction, can be manufactured at low cost and has improved reliability.

According to this invention there is provided a code signal input apparatus comprising code signal-generating means such as an electric switch associated with apparatus at remote measuring point, an insulation transformer connected between the code signal-generating means and a computer, a diode connected in the circuit interconnecting the primary winding of the insulation transformer and the signal-generating means, and a capacitor connected across the primary winding to store the condition of the code signal, the polarity of the diode being selected such that the diode responds to the voltage across the capacitor to write the code signal into the computer. An impulse is normally applied to the secondary winding of the insulation transformer to charge the capacitor to a predetermined value. When the switch or code signal-generating means located at a measuring point is closed the capacitor is shorted by the switch to decrease the secondary impedance of the insulation transformer, thus generating a signal corresponding to the code signal generated by the switch.

DESCRIPTION OF THE PREFERRED EMBODIMENTS

Figures 1, 2:
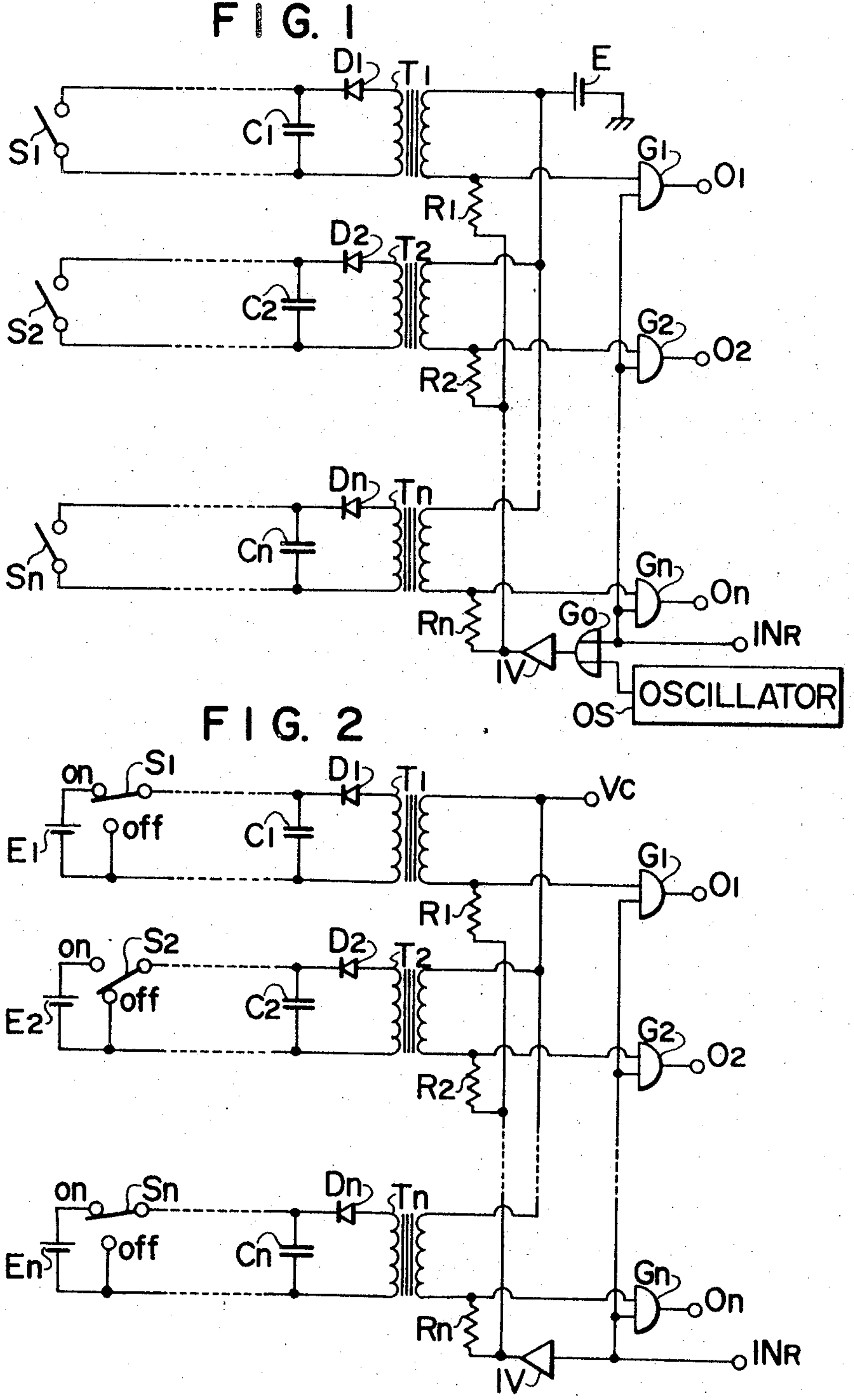
FIG. 1 is a connection diagram of one embodiment of the code signal input apparatus embodying this invention.
FIG. 2 is a connection diagram of a modified embodiment of this invention.

A preferred embodiment of this invention illustrated in FIG. 1 comprises a plurality of switches $S_1$ , $S_2$ and $S_n$ installed at measuring points for generating code signals. Across signal lines controlled by switches $S_1$ , $S_2$ $S_n$ are connected capacitors $C_1$ , $C_2$ $C_n$ and the signal lines are connected to the primary windings of insulation transformers $T_1$ , $T_2$ $T_n$ , respectively, through diodes $D_1$ , $D_2$ $D_n$ . One terminal of the secondary windings of insulation transformers $T_1$ , $T_2$ $T_n$ is connected to one input terminals of AND-gate circuits $G_1$ , $G_2$ $G_n$ and also to the common output terminal of an inverter IV. The other terminal of the secondary windings of the insulation transformers are connected to one pole of a DC source having the other terminal grounded. An input terminal of readout signals INR is connected to the other input terminals of the AND-gate circuits $G_1$ , $G_2$ $G_n$ and to one input terminal of an OR-gate circuit $G_0$ . The output of an oscillator OS is connected to the other input terminal of the OR-gate circuit $G_0$ and the output thereof is supplied to the input terminal of the inverter circuit IV. The output terminals of the AND-gate circuits are connected to output terminals $O_1$ $O_2$ $O_n$ of the code signals.

Figure 3:
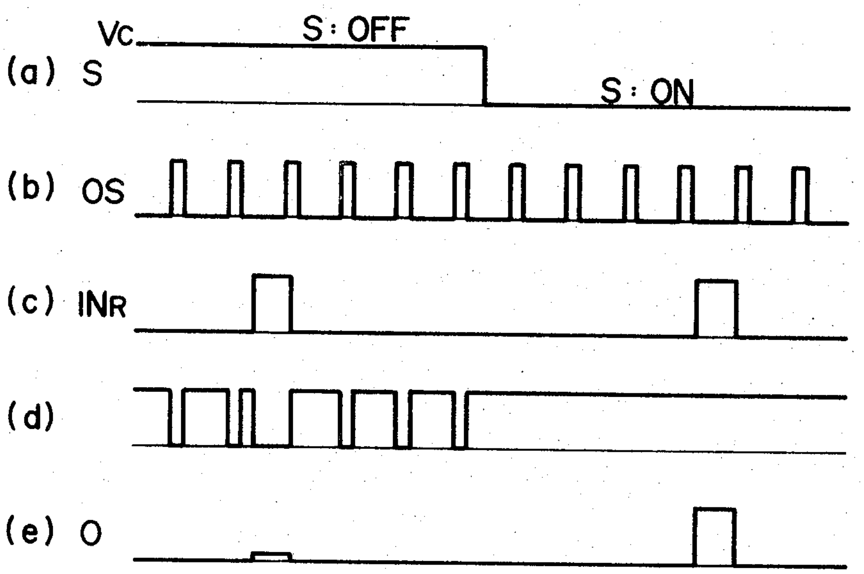
FIG. 3 shows a set of waveforms to explain the operation of the apparatus shown in FIG. 1

The operation of the code signal input apparatus shown in FIG. 1 is as follows:

The contacts of the code signal-generating switches $S_1$ $S_2$ $S_n$ installed at the measuring points are controlled corresponding to the code signals to be sent to the computer. The pulse oscillator OS generates a pulse signal of a given frequency as shown in FIG. 3*b* , to apply the pulse signal to the input terminal of inverter circuit IV. through OR-gate circuit $G_0$ . To read out the conditions of contacts of switches $S_1$ , $S_2$ $S_n$ at the measuring points and write them into the computer, a readout signal as shown in FIG. 3*c* is applied to the readout signal input terminal INR and this signal is impressed upon the input terminal of the inverter circuit IV which functions to invert the output signal from the oscillator OS as shown in FIG. 3*b* , and the signal applied to the readout signal input terminal INR as shown in FIG. 3*c* to produce a signal of the waveform as shown in FIG. 3*d* . This signal is applied to one terminal of the secondary windings of insulation transformers $T_1$ , $T_2$ $T_n$ respectively through resistors $R_1$ , $R_2$ $R_n$ . As a consequence, AC signals corresponding to the output signal of the inverter circuit IV are induced in the primary windings of respective insulation transformers and these AC signals are rectified by diodes $D_1$ , $D_2$ $D_n$ to charge capacitors $C_1$ , $C_2$ $C_n$ respectively.

Where switches $S_1$ , $S_2$ $S_n$ are opened, capacitors $C_1$ , $C_2$ $C_n$ will be charged by a definite voltage Vc corresponding to the crest value of the output signal from the inverter circuit IV as shown in FIG. 3*a* , whereas when the switches are in their closed state, the condensers are shorted by the switches so that they will not be charged. In this manner, when the switches are opened, diodes $D_1$ , $D_2$ $D_n$ are reversely biased by the voltage Vc of capacitors $C_1$ , $C_2$ $C_n$ and hence are maintained OFF to open the circuits through the primary windings of insulation transformers $T_1$ , $T_2$ $T_n$ . This reflects in the increase in the secondary impedance of the insulation transformers. Since no current flows through the primary winding no voltage drop appears across resistors $R_1$ , $R_2$ $R_n$ that no output signal appears at output terminals $O_1$ , $O_2$ $O_n$ as shown on the left-hand half of FIG. 3*e* even when a signal shown in FIG. 3*c* is impressed upon readout signal input terminal INR. On the other hand, when switches $S_1$ , $S_2$ $S_n$ are closed capacitors $C_1$ , $C_2$ $C_n$ are short circuited and their terminal voltage is zero so that diodes $D_1$ , $D_2$ $D_n$ are in their conductive state to short circuit the primary windings of the insulation transformers. For this reason, the secondary windings are maintained at low impedance condition so that the junctures between the secondary windings and respective resistors $R_1$ , $R_2$ $R_n$ are at the voltage V of the DC source E. Under these conditions upon application of a signal shown in FIG. 3*c* on the signal readout terminal INR, gate circuits $G_1$ , $G_2$ $G_n$ are opened or enabled to read out the voltage V at the junctures onto output terminals $O_1$ , $O_2$ $O_n$ through gate circuits $G_1$ , $G_2$ $G_n$ as shown on the right-hand portion of FIG. 3*e* . In this manner, code signals represented by the ON, OFF conditions of the switches $S_1$ , $S_2$ $S_n$ installed at the measuring points are read out on output terminals $O_1$ , $O_2$ $O_n$ as signals (shown in FIG. 3*e* ) corresponding to the ON, OFF conditions of the switches by the signal readout signal (FIG. 3*c* ) impressed upon signal readout terminal INR.

As can be clearly noted from the foregoing description, according to the code signal input apparatus of this invention a pulse signal is normally impressed upon the secondary winding of a transformer for providing DC insulation between a code signal-generating switch installed at a measuring point and the AC component of the impulse is rectified by a diode on the primary side of the insulation transformer to charge a capacitor, which is utilized as a DC source for biasing the diode. This arrangement eliminates a DC source to be installed at the measuring point. Further where a number of code signal-generating switches are used they are completely isolated from each other. When compared with conventional apparatus it is not only possible to greatly simplify the construction but also to reduce its manufacturing cost and to greatly improve the reliability Thus the novel code signal input apparatus is suitable for many applications where it is required to write code signals generated in accordance with ON, OFF conditions of switches into computers.

FIG. 2 shows a modified code signal input apparatus embodying this invention. In this embodiment DC source $E_1, E_2 \ldots E_n$ are connected to input terminals of respective switches $S_1, S_2 \ldots S_n$ to constitute level signal-generating circuits which are associated with machines and apparatus installed at a remote station. In the same manner as in FIG. 1 these switches are connected to the primary windings of insulation transformers $T_1, T_2 \ldots T_n$ through diodes $D_1, D_2 \ldots D_n$ and capacitors $C_1, C_2 \ldots C_n$. One terminal of the secondary windings of insulation transformers are commonly connected to an input terminal Vc of a DC voltage while the other ends to one input terminal of AND-gate circuits $G_1, G_2 \ldots G_n$, respectively and to the output terminal of an inverter circuit IV through resistors $R_1, R_2 \ldots R_n$ respectively. A readout signal input terminal INR is connected to respective input terminals of AND-gate circuits $G_1, G_2 \ldots G_n$ and further to the input terminal of the inverter circuit IV. Output terminals of AND-gate circuits $G_1, G_2 \ldots G_n$ are connected to output terminals $O_1, O_2 \ldots O_n$, respectively.

The modified embodiment shown in FIG. 2 operates as follows:

The contacts of code signal-generating switches $S_1, S_2 \ldots S_n$ associated with remote machines and apparatus are opened or closed in accordance with code signals to be sent to the computer. When closed (ON) these switches send the voltage V of DC sources $E_1, E_2 \ldots E_n$ over associated transmission lines whereas when opened (OFF) they short circuit the transmission lies. Thus, by the ON, OFF operations of switches $S_1, S_2 \ldots S_n$ code signals as shown in FIG. 4*a* are sent out.

When switches $S_1, S_2 \ldots S_n$ are closed (ON) capacitors $C_1, C_2 \ldots C_n$ are charged by DC sources whereas when the switches are opened (OFF) they short circuit capacitors $C_1, C_2 \ldots C_n$ so as not to charge them. In this manner, as shown in FIG. 4*b* capacitors $C_1, C_2 \ldots C_n$ are charged to a voltage corresponding to code signals. To write the conditions of code signals generated in this manner into the computer, a write signal shown in FIG. 4*c* is applied to a write signal input terminal INR. This signal is inverted by the inverter circuit IV, and the output from the inverter circuit of a waveform as shown in FIG. 4*d* is supplied to one terminals of the secondary windings of insulation transformers through resistors $R_1, R_2 \ldots R_n$ respectively. This induces pulse signals in the primary windings of the insulation transformers, said pulse signals performing ON, OFF control of diodes according to the charging conditions of capacitors $C_1, C_2 \ldots C_n$.

Figure 4:
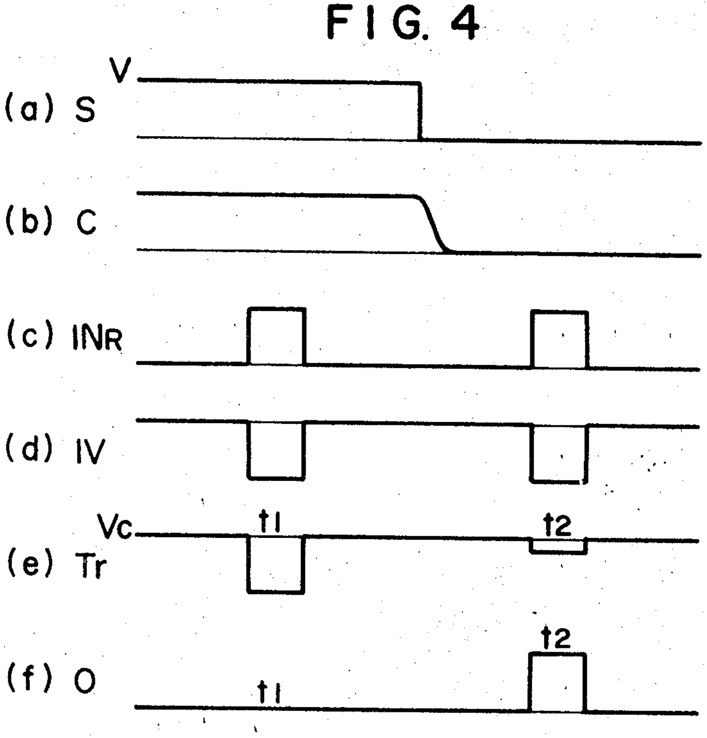
FIG. 4 shows a set of waveforms to explain the operation of the apparatus shown in FIG. 2.

As above described, when switches $S_1, S_2 \ldots S_n$ are maintained ON capacitors $C_1, C_2 \ldots C_n$ are charged to a constant voltage V by DC sources $E_1, E_2 \ldots E_n$ as shown in FIG. 4*a* whereas when switches $S_1, S_2 \ldots S_n$ are opened (OFF) capacitors $c_1, C_2 \ldots C_n$ are short circuited so that their terminal voltage are zero. As a result, so long as switches $S_1, S_2 \ldots S_n$ are in their ON st ate, diodes $D_1, D_2 \ldots D_n$ are reversely biased by the voltages V across capacitors so that these diodes are maintained OFF to maintain the primary windings of the insulation transformers in their opened condition. This results in a high impedance of the secondary windings of the insulation transformers and since no current flows through the primary windings thereof high negative voltages $t_1$ shown in FIG. 4*e* will be applied across resistors $R_1, R_2 \ldots R_n$. For this reason, even when a signal shown by FIG. 4*c* is impressed upon the signal readout terminal INR no pulse signal will be produced at output terminals $O_1, O_2 \ldots O_n$ as shown at $t_1$ of FIG. 4*f*. Conversely, when switches $S_1, S_2 \ldots S_n$ are in their OFF condition, since capacitors $C_1, C_2 \ldots C_n$ are short circuited and their terminal voltages are zero, impression of a pulse voltage upon the secondary windings of the insulation transformers causes diodes $D_1, D_2 \ldots D_n$ to become conductive to short circuit the primary windings of insulation transformers. Thus the secondary windings of these transformers are maintained in their low impedance conditions, the junctures between the lower terminals of the secondary windings and resistors $R_1, R_2 \ldots R_n$ are maintained substantially at the voltage of the DC input terminal as shown at $t_2$in FIG. 4*e*. Under these conditions when a signal as shown in FIG. 4*c* is impressed upon one input terminals of AND-gate circuits $G_1, G_2 \ldots G_n$ through readout signal input terminal INR, the voltages Vc at said junctures are read out on output terminals $0_1, 0_2 \ldots 0_n$ through AND-gate circuits $G_1, G_2 \ldots G_n$ as shown at $t_2$ of FIG. 4*f*.

In this manner code signals generated by switches at remote measuring points are read out on to output terminals as output signals shown in FIG. 4*e*.

While the invention has been shown and described in terms in some preferred embodiments, it will be clear that the invention is by no means limited to these particular embodiments and that many changes and modifications will occur to one skilled in the art without departing from the true spirit and scope of the invention as defined in the appended claims.

What is claimed is:

1. Code signal input apparatus comprising code signal-generating means, an insulation transformer connected between said code signal-generating means and a computor, a diode connected in the circuit interconnecting the primary winding of said insulation transformer, and said code signal-generating means, and a capacitor connected across said primary winding to store the condition of said code signal, the polarity of said diode being selected such that said diode responds to the voltage across said capacitor to write said code signal into said computer.

2. Code signal input apparatus comprising a plurality of code signal-generating switches which generates code signals by the opened and closed conditions of their contacts, transmission lines each including a diode and a capacitor, insulation transformers respectively connecting said switches to data processing means of a computer through said transmission lines, means to normally supply a pulse signal to the secondary windings of said insulation transformers to charge said capacitors through said diodes to cause said capacitors to act as bias sources for said diodes whereby to vary the impedances of the secondary windings of said insulation transformers in response to the closed and opened conditions of said switches to read said code signals generated by the opening and closing of said switches.

3. The code signal input apparatus according to claim 2 which further comprises an inverter to invert said pulse signal so as to apply the inverted signal to one terminal of said secondary windings of said insulation transformers respectively through resistors, means to apply a DC voltage to the other terminals of said secondary windings and AND-gate circuits, one input of said AND-gate circuits being connected to said one terminal of said secondary windings and the other input of said gate circuits being connected to receive said pulse signals.

* * * * *